May 3, 1960  R. D. BELLI ET AL  2,934,989
DRUM HEAD
Filed Aug. 15, 1957
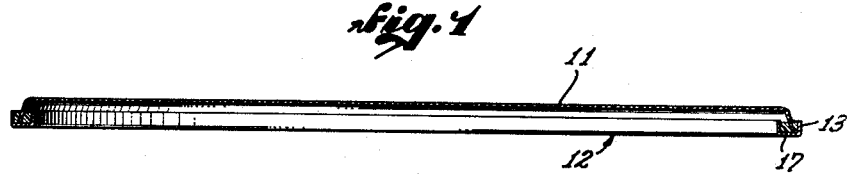
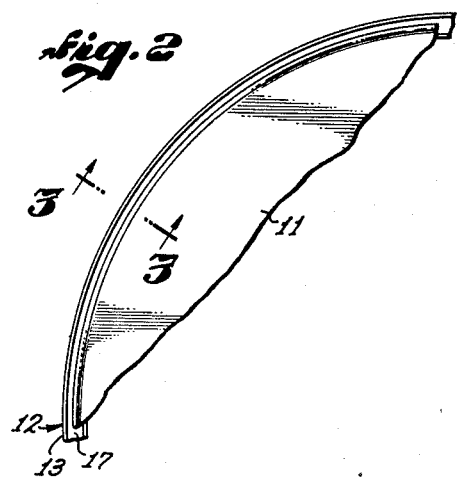
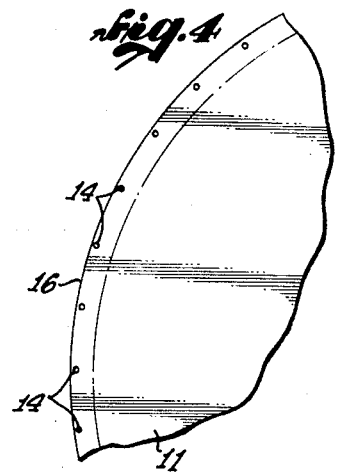
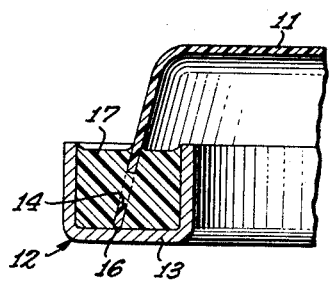
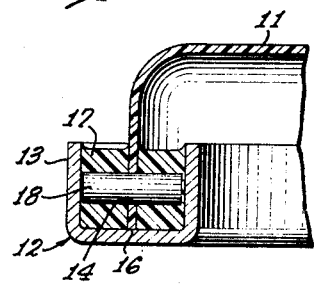
REMO D. BELLI &
SAMUEL N. MUCHNICK,
INVENTORS.
HERZIG & JESSUP,
ATTORNEYS.
BY Warren T. Jessup

2,934,989

DRUM HEAD

Remo D. Belli, Pacoima, and Samuel N. Muchnick, Los Angeles, Calif., assignors to Remo, Inc., Los Angeles, Calif., a corporation of California Application August 15, 1957, Serial No. 678,339

7 Claims. (Cl. 84—414)

This invention relates to drum heads and methods of making the same.

In the past, drum heads have commonly been made of animal skins disposed or stretched across a ring, which is in turn clamped over the cylindrical body of the drum. Modern plastics offer superior substitutes for animal skins in many cases, but the satisfactory securement of such plastics to the drum ring has been somewhat of a problem. It is an object of this invention to provide an improved drum head and method of making same which is adaptable to the use of modern tough and strong plastics to replace the conventional animal skins.

It is another object of this invention to provide an improved drum head and method of making same which results in a product having superior durability and weathering qualities, and one which is substantially unaffected by exposure to the elements, such as sunshine and rain.

It is another object of this invention to provide an improved securement of the edge of a sheet of pliant material, such as plastics, to a drum ring.

In accordance with these and other objects which will become apparent hereinafter, preferred forms of the present invention will now be described with reference to the accompanying drawings, wherein:

Fig. 1 is a cross section of a drum head embodying features of the present invention;

Fig. 2 is a fragmentary plan view of the drum head of Fig. 1;

Fig. 3 is a fragmentary cross section taken on line 3—3 in Fig. 2;

Fig. 4 is a fragmentary plan view of a circular sheet of pliant material, such as plastics, before its mounting to the drum head ring; and Fig. 5 is a cross section, similar to Fig. 3, illustrating a modified form of securement of the drum head sheet.

Referring to the drawings, there is shown in Fig. 1 a ring, preferably substantially circular, across which is imposed or stretched a sheet 11 constituting the drum head. The sheet 11 is preferably made of a tough, strong and durable plastics, for example, of the type marketed under the name Mylar. The ring 12 is in the form of a channel 13 having a U-shaped cross section shown in Fig. 3, with the opening or mouth of the U facing in the direction of the axis of the ring 11, in this case upward. The sheet 11 is imposed across the channel ring 12 and the peripheral edges of the sheet 11 are turned downwardly into the channel 13.

As shown in Fig. 4, the sheet 11 is provided around and adjacent its peripheral edge 16 with a plurality of apertures 14 spaced close enough to the edge that when the edge 16 is turned downwardly into the channel 13, the apertures 14 reside in the channel, as shown in Fig. 3.

In the fabrication of the present drum head, the plastics sheet 11 is first turned downward at its edge 16 and the edge is then inserted into the ring 12, as shown in Fig. 3. A resinous bonding material 17 is then flowed in liquid form into the channel 13, embedding the edge 16 in the channel, and passing through the apertures 14, thereby enhancing the securement of the bonding material 17 (Fig. 3) to the plastics sheet 11. The bonding material is preferably provided with a setting or hardening agent, and is allowed to harden or polymerize to complete the fabrication of the drum head.

In case difficulty is encountered in centering the edge 16 in laterally in the channel 13, small dowels 18 may be positioned in the apertures 14, and being of length to substantially span the channel 13, they serve to position the edge of the sheet 11 in the channel 13, as shown in Fig. 5.

The bonding material 17 may be any suitable material which can be prepared in liquid phase and then hardened or set in bonding relation to the inner walls of the channel ring 12 and the edge of the plastics sheet 11.

A suitable bonding material has been found to be the following composition:

| | Grams |
|---|---|
| Liquid epoxy (Epon 80) | 250 |
| Polysulfide rubber | 50 |
| Triethylenetetramine | 25 |

While the instant invention has been shown and described herein in what are conceived to be the most practical and preferred embodiments, it is recognized that departures may be made therefrom within the scope of the invention which is therefore not to be limited to the details disclosed herein, but is to be accorded the full scope of the claims.

What is claimed is:

1. A drum head comprising a channel ring member substantially U-shaped in cross section and opening upwardly, a vibratile diaphragm sheet comprised of relatively pliant, tough, strong and durable synthetic plastic material imposed over and substantially across said ring member with the peripheral edge thereof turned downwardly and seated in the U-shaped channel member and a solid phase synthetic plastic composition filling said U-shaped channel and embedding and bond-securing the peripheral edge of said sheet non-removably to said ring member.

2. The drum head of claim 1, said vibratile diaphragm being provided with a plurality of spaced openings in close spaced relation to the edge thereof said plastic composition extending through said openings to assist in locking said diaphragm in said composition.

3. The drum head of claim 1, said vibratile diaphragm being provided with a plurality of spaced openings in close spaced relation to the edge thereof and wherein a plurality of pin members are disposed in some of said openings, the length of said pin members being adapted to wedge engage the side walls of said channel ring member and secure the said diaphragm in said imposed position on said ring member.

4. The drum head of claim 1, said vibratile diaphragm sheet being comprised of the synthetic plastic composition known as Mylar.

5. A drum head as defined in claim 1, including spaced elements extending through said diaphragm adjacent the peripheral edge thereof and interlocking with said composition.

6. A drum head as defined in claim 1, wherein said composition comprises a mixture of liquid epoxy, polysulfide rubber and triethylenetetramine.

7. A drum head as defined in claim 1, wherein said diaphragm is substantially planar and wherein the said peripheral edge thereof comprises a depending annular flange extending into said U-shaped channel.

(References on following page)

References Cited in the file of this patent

UNITED STATES PATENTS

| | | |
|---|---|---|
| 544,125 | Sapp | Aug. 6, 1895 |
| 1,404,113 | Gonnella | Jan. 17, 1922 |
| 1,459,437 | Bowman | June 19, 1923 |
| 1,544,289 | Wagner | June 30, 1925 |
| 1,955,219 | Beiger | Apr. 17, 1934 |
| 2,524,592 | Cordes | Oct. 3, 1950 |

FOREIGN PATENTS

| | | |
|---|---|---|
| 298,533 | Switzerland | July 16, 1954 |